United States Patent
Braeuchle et al.

(10) Patent No.: US 7,265,510 B2
(45) Date of Patent: Sep. 4, 2007

(54) METHOD AND ARRANGEMENT FOR SIGNALIZING A DEACTIVATION OF A DRIVER ASSISTANCE SYSTEM

(75) Inventors: Goetz Braeuchle, Reichartshausen (DE); Martin Heinebrodt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 10/747,355

(22) Filed: Dec. 30, 2003

(65) Prior Publication Data

US 2004/0167695 A1    Aug. 26, 2004

(30) Foreign Application Priority Data

Dec. 30, 2002    (DE)    ................. 102 61 799

(51) Int. Cl.
*G05D 1/00*    (2006.01)
(52) U.S. Cl. .............. 318/580; 318/628; 180/168; 180/170; 701/28; 701/41
(58) Field of Classification Search ............. 701/41, 701/28, 23, 93; 180/170, 168; 318/580, 318/628
See application file for complete search history.

(56) References Cited

U.S. PATENT DOCUMENTS

| | | | | |
|---|---|---|---|---|
| 5,197,562 | A | * | 3/1993 | Kakinami et al. .......... 180/169 |
| 5,245,422 | A | * | 9/1993 | Borcherts et al. .......... 348/119 |
| 5,799,262 | A | * | 8/1998 | Suzuki ....................... 701/93 |
| 6,370,471 | B1 | | 4/2002 | Lohner et al. |
| 6,580,987 | B2 | * | 6/2003 | Sadano et al. ............... 701/41 |
| 6,681,170 | B2 | * | 1/2004 | Winner et al. ............... 701/93 |

FOREIGN PATENT DOCUMENTS

| | | |
|---|---|---|
| DE | 198 21 163 | 11/1999 |
| DE | 198 51 434 | 5/2000 |
| WO | WO 02/27351 | 4/2002 |

* cited by examiner

*Primary Examiner*—Rina Duda
(74) *Attorney, Agent, or Firm*—Walter Ottesen

(57) ABSTRACT

The invention is directed to a method and an arrangement for signalizing the controlled deactivation of an assistance system during operation of motor vehicles (10) which are steerable by a steering manipulation device (36). The method is characterized in that the signalization takes place via a touch-sensitive signal generated in a controlled manner in the steering manipulation means (36). For this purpose, the arrangement includes actuating means (38, 78) which impresses a touch-sensitive signal on the steering manipulation device (36) with the signal being generated in a controlled manner.

13 Claims, 5 Drawing Sheets

METHOD AND ARRANGEMENT FOR SIGNALIZING A DEACTIVATION OF A DRIVER ASSISTANCE SYSTEM

FIELD OF THE INVENTION

The invention relates to a method and an arrangement for signalizing the controlled deactivation of a driver assistance system when operating a motor vehicle steerable with a steering manipulation means.

BACKGROUND OF THE INVENTION

A driver assistance system is an arrangement which supports the driver of a motor vehicle when guiding the vehicle. Known examples are: anti-blocking systems as well as drive dynamic control systems which support the driver in an unstable driving situation by brake intervention and/or motor interventions which operate to stabilize.

Further examples of driver assistance systems are arrangements which hold the speed of the vehicle and/or the distance to the ahead-traveling vehicle within desired limits.

Furthermore, systems are under development which support the driver for a transverse guidance of the vehicle. Such driver assistance systems are also characterized as lane-keeping systems and, as a rule, include sensor means which detect the distance of the motor vehicle to the edges of the roadway. This distance is controlled on the basis of these signals with the aid of an external force steering.

A driver assistance system of this kind is disclosed in German patent publication 198 21 163. According to this publication, the driver assistance system is deactivated from time to time in a controlled manner in specific driving states. A controlled deactivation takes place in a wanted manner differently from a disablement of the driver assistance systems because of a defect. These specific operating states correspond, for example, to situations for which the driver assistance system is not designed and in which the system can therefore not purposefully support the driver.

In order to signalize the deactivation to the driver, German patent publication 198 21 163 mentions also a "touch-sensitive" signalization in addition to optical and acoustic signals. According to this publication, such a signalization results when, because of the absence of a control of the steering by a track maintaining device, a corresponding force feedback announcement is no longer present. Stated otherwise, a touch-sensitive message to the driver as to a deactivated driver assistance system takes place in that a support function on the steering wheel is no longer perceptible. Such a signalization takes place passively without active generation of a touch-sensitive signal.

In general, several cases are conceivable wherein a driver assistance system for transverse guidance support switches off automatically. For example, the lane data becomes lost because no roadway markings are present. Furthermore, unclear lane data can be present, for example, double-white and yellow markings at a roadway construction site. In this case, the driver must immediately recognize the situation and again take over the driving task. When the driver assistance system for transverse driving support is at first active and is then switched off, there are two cases to be distinguished.

In a first case, the vehicle is on an ideal line. As a consequence, the transverse guidance support system outputs no actuating quantity. In this way, there is also no feedback of an actuating variable perceptible in the steering manipulation means which, in general, is a steering wheel.

In this case, it can happen that the driver does not notice that the system is no longer available because the feel on the steering wheel without an applied force does not differ from the normal state. Acoustic or optical displays of the system switchoff may not be heard or can be overlooked.

A second case is present when the vehicle is not on the ideal line. In this case, the transverse guidance support system outputs an actuating variable which is perceptible in the steering wheel. When, at this instance, the transverse guidance support system is switched off abruptly, this can lead to dangerous driving behavior especially in the case of an unattentive driver when the driver realizes too late that the transverse guidance support system is no longer available. To avoid abrupt switchoffs, and for a safe and simultaneously comfortable function, one would select a continuous reduction of the additional torque on the steering wheel which results from the transverse guidance support. However, the switchoff can go unnoticed by the unattentive driver. If the driver in this case follows the reduced additional torque, which is still perceptible in the steering wheel, this can lead to a leaving of the driving lane because the still perceptible additional torque is no longer commensurate with the driving situation.

SUMMARY OF THE INVENTION

With this background, it is an object of the invention to provide a method and an arrangement which signalize to the driver a deactivation of the driver assistance system independently of a possible force feedback announcement which the driver assistance system generates in the activated state in the steering manipulation means. The signal should be clearly perceivable by the driver and take place without delay.

The method of the invention is for signalizing the controlled deactivation of a driver assistance system when operating a motor vehicle steerable with steering manipulation means. The method includes the step of causing the signalizing to take place with a touch-sensitive signal generated in a controlled manner.

The arrangement of the invention is for signalizing the controlled deactivation of a driver assistance system during operation of a motor vehicle steerable with steering manipulation means. The arrangement includes actuating means for impressing a controlledly generated touch-sensitive signal on the steering manipulation means.

Here, it is preferable that the assistance system, in the activated state, controls the distance to a traveling-ahead vehicle and/or the speed of the vehicle and/or the transverse guidance of the motor vehicle.

These special driver assistance systems relieve the driver in a special manner when they are activated. In these driver assistance systems, it is especially important therefore to inform the driver clearly as to a deactivation in order to timely prepare the driver as to a takeover of the deactivated functions.

It is further preferable that the touch-sensitive signal comprises at least one pulse which deflects the steering manipulation means temporarily out of its original position.

It has been shown that such a pulse, which is transmitted via the steering manipulation means, is immediately and clearly realized by the driver also with a simultaneous occurrence of optical and/or acoustic irritations. It has further been shown that the touch-sensitive signalization via the steering manipulation means intuitively brings the driver to direct his view to the traffic lying ahead of him in the driving direction. In this way, the driver can immediately take over the function of the deactivated or to be deactivated driver assistance system and adequately react to changes of the traffic situation.

It is further preferable that the actuating means deflects the steering manipulating means out of its original position in a pulse-like manner.

It has been shown that a pulse-shaped short-term deflection is, on the one hand, clearly perceptible by the driver and, on the other hand, also when the pulse, because of the construction of the vehicle steering, is transmitted to the wheels, does not lead to a deterioration of the lane position and/or the driving stability.

It is furthermore preferable that the steering manipulation means is a steering wheel, that the time-width of the pulse is less than 500 ms and that the magnitude of the deflection of the steering wheel is less than 5 degrees.

This configuration transfers the above-mentioned advantages to a vehicle having a steering wheel as a steering manipulation means. The above-mentioned values have resulted as advantageous compromises with reference to requirements for maximum clear perceptibility with the least possible effect on the driving stability. With the limiting of the deflection values, which are less than 5 degrees, the deflection takes in an angular range which, in the order of magnitude, corresponds to the play of the steering. For this reason, the influence of the touch-sensitive pulse on the driving stability is reduced also for a coupling of steering wheel and wheels outside the play. The coupling is such that the steering wheel and wheels rotate together.

Furthermore, it is preferable that the pulse is generated by the actuating system of the transverse guidance support system.

This configuration has the advantage that no additional actuating members are necessary in order to realize the invention.

It is preferable that the deactivation of a transverse guidance support system be triggered by an image processing system to which lane data is supplied by sensor means which detect the roadway edge.

In such transverse guidance support systems, one must expect many intersecting markings such as at construction sites, often with a deactivation of the system. For this reason, the invention reveals the above-mentioned advantages in combination with such a system to a special degree.

Furthermore, it is preferred that the deactivation be generated by a continuous controlling down of the influence of the actuating system of the transverse guidance support system.

A continuous controlling down minimizes, on the one hand, disturbing effects on the driving stability and can, on the other hand, without touch-sensitive signaling, lead to the situation that the driver only realizes the deactivation in a delayed manner.

This disadvantage is avoided by the invention.

Furthermore, it is preferred that the pulse is generated by a computer impressing of a control pulse on an actuating variable of the actuating system, a desired value of the actuating system, an actual value, which is made available by the sensor means, or on a deviation of the actual value from the desired value. The deviation of the desired value is supplied to the actuating system.

These configurations make possible a use of the available actuating system for realizing the invention and contribute to avoiding otherwise required ancillary equipment.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
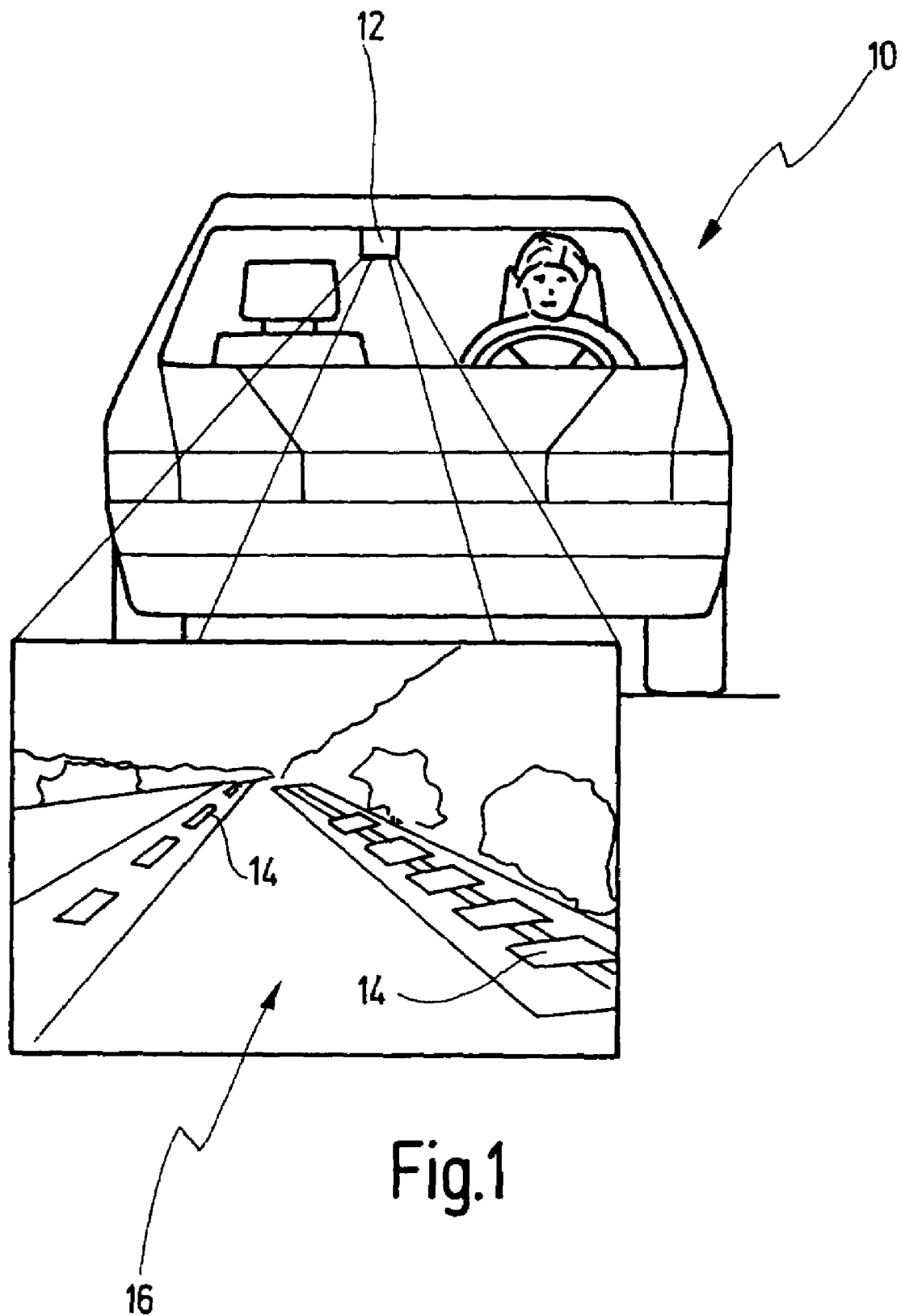
FIG. 1 is a schematic of a motor vehicle having sensor means for detecting roadway edges in the context of a transverse guidance support system.

Reference numeral 10 in FIG. 1 identifies a motor vehicle which is equipped with a transverse support system. For this purpose, the motor vehicle 10 has sensor means 12 which supply an image of the travel lane ahead of the motor vehicle 10 in the travel direction thereof. The sensor means 12 can, for example, include a CCD camera. Roadway markings, which lie in the field of view of the camera 12, are detected in a downstream connected image processing unit. The image processing unit generates lane data from the sequence of the detected roadway markings and a desired value for automated external force steering is obtained from the lane data.

Figure 2:
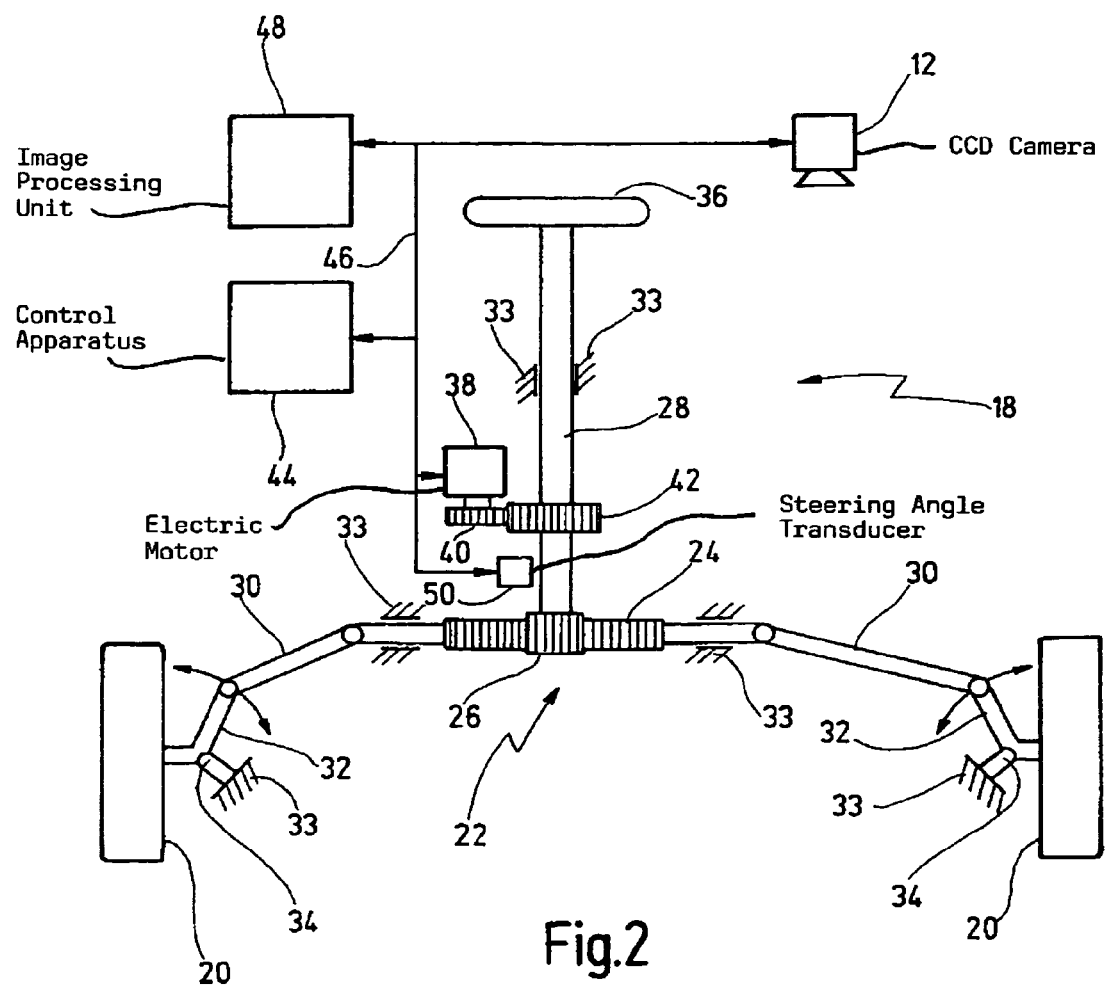
FIG. 2 is a schematic of a first embodiment of a transverse guidance support system for a motor vehicle.

Details of one such transverse support system are explained hereinafter with reference to FIG. 2 which shows a first embodiment of a transverse guidance support system for a motor vehicle. In FIG. 2, the total of the transverse guidance support system is identified by reference numeral 18. The wheels 20 of the motor vehicle 10 are steered by the transverse guidance support system 18. For this purpose, the transverse guidance support system 18 includes, inter alia, a steering gear 22 having a rack 24 and a pinion wheel 26. The pinion 26 is fixedly coupled to the steering column 28 so as to rotate therewith via which the wanted steering intervention in the steering gear 22 is coupled in. Pinion 26 meshes with rack 24 which, in turn, turns the wheels 20 via track rods 30 and steering levers 32, about an axle pivot rotation point 34 connected fixedly to the chassis 33 of the motor vehicle 10.

With a deactivated system for transverse guidance support, the steering column 28 is actuated via a steering wheel 36 by the driver of the motor vehicle 10. Alternatively to an actuation via the steering wheel 36, the steering column 28 can be actuated by an electric motor 38 when the system for transverse guidance support is activated. The drive toothed wheel 40 of the electric motor 38 meshes with a gear wheel 42 connected to the steering column 28 so as to rotate therewith. For this purpose, the electric motor 38 is driven by a control apparatus 44 via a bus system 46. The control apparatus 44 communicates additionally with an image processing unit 48 and a steering angle transducer 50 via the bus system. The output signals of the CCD camera 12 are supplied to the image processing unit 48 via the bus system 46 or also via a separate connecting line.

In the following, the function of the transverse guidance support system 18 is explained with reference to FIG. 3.

Figure 3:
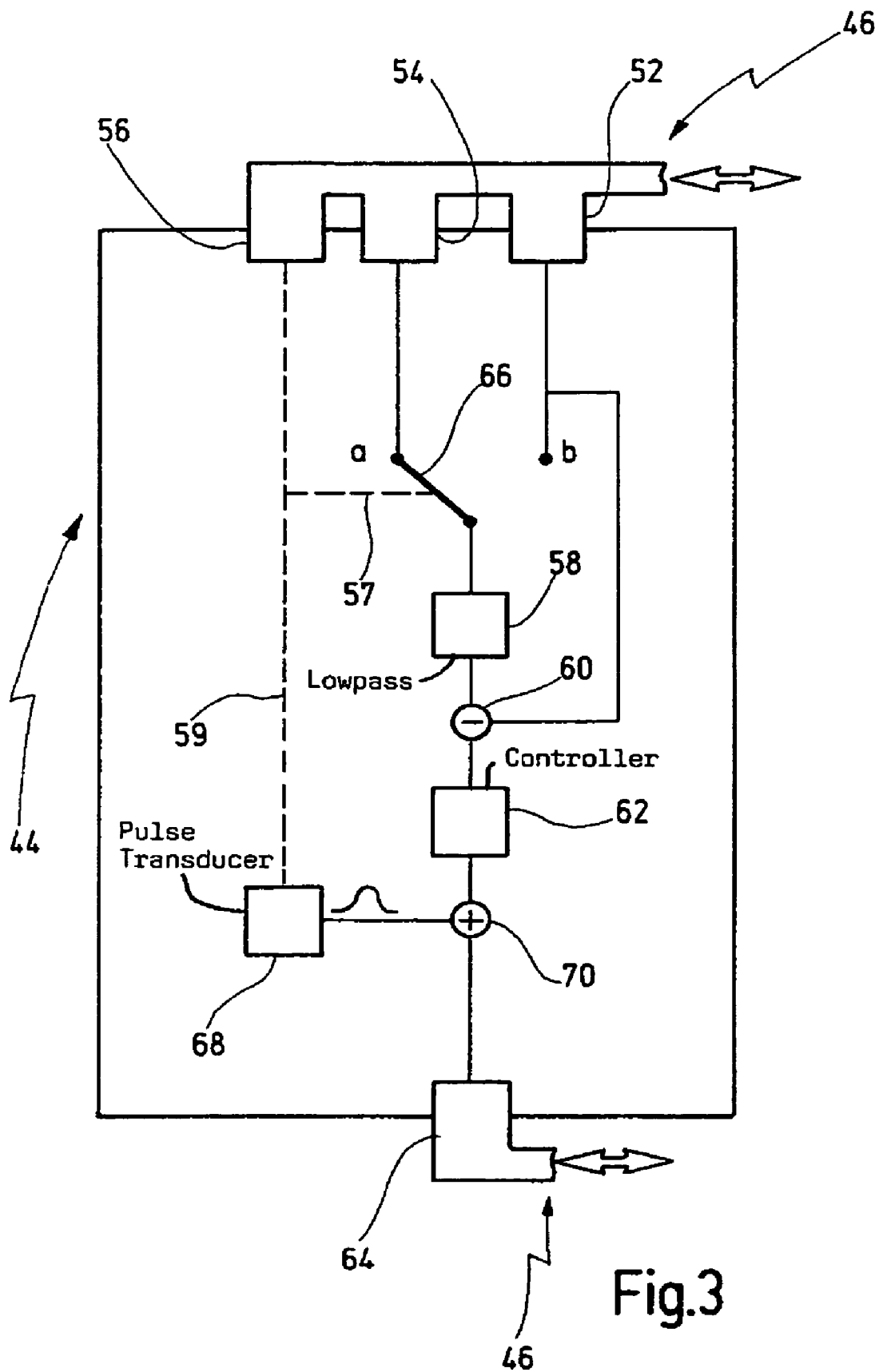
FIG. 3 is a function block diagram of a control apparatus for the first embodiment of the invention.

FIG. 3 shows the functions of the control apparatus 44 in the context of a schematic. The control apparatus 44 communicates via bus system 46 with the connected components. For this purpose, the control apparatus 44 has a first input channel 52 via which the signal of the steering angle transducer 50 is inputted to the control apparatus 44. Furthermore, the control apparatus 44 includes a second input channel 54 and a third input channel 56. Signals of the image processing unit 48 are supplied via these two channels (54, 56) to the control apparatus 44.

With an activated transverse guidance support, a desired value is supplied to the control apparatus 44 via the input channel 54. This desired value is generated by the image processing unit 48 and can, for example, correspond to a desired steering angle. This desired value is supplied to a logic position 60 via the closed switch 66 and a lowpass 58. In addition to the desired value, a steering angle actual value is applied to the logic position 60. The steering angle actual value was supplied by the steering angle transducer 50 via the bus system 46 and an input channel 52 of the control apparatus 44. This actual value is subtracted from the desired value in the logic position 60. Correspondingly, the logic position 60 supplies the deviation of the actual value from the desired value. This deviation is supplied in the following to a controller 62 which forms a drive signal therefrom for the electric motor 38. This drive signal is supplied via a logic position 70, an output channel 64 of the control apparatus 44 and via the bus system 46 to the electric motor 38. The function of the logic position 70 is explained hereinafter.

The illustration of FIG. 3 with the switch position of switch 66 shown corresponds to an activated transverse guidance support. As a consequence thereof, for an activated transverse guidance support, the steering angle is controlled in a closed control loop comprising CCD camera 12, image processing unit 48, controller 62 and the electric motor 38 serving as an actuating member.

With a loss of the lane data or for unclear lane data as was explained above, the image processing unit 48 cannot generate a reliable desired value for the steering angle. This state is detected in the image processing unit 48 which thereupon transmits a signal via the bus system 46 to an input channel 52 of the control apparatus 44 with which the transverse guidance support is deactivated.

With the presence of this signal, switch 66 is released via the signal path 57 from the position shown at (a) and is switched into the position shown by (b). Correspondingly, the desired value, which is supplied to the downstream controller 62, is no longer made available by the image processing unit 48 via the input channel 54; instead, the desired value is made available by the steering angle transducer 50 via the input channel 52.

For a steady-state lowpass 58, the same signals are thereby applied to the logic position 60 so that the control deviation, which is supplied by the logic position 60, is equal to zero. Stated otherwise, in the switch position of the switch 66, which is characterized by (b), the transverse guidance support is deactivated by the controller 62. Accordingly, the driver must again take over the driving task from the transverse guidance support system 18. In order to signalize this to the driver touch-sensitively via the steering wheel 36, the deactivation signal, which is supplied via the input channel 56, is not only used for actuating the switch 66; rather, this deactivation signal is also used via the signal path 59 to trigger a pulse transducer 68.

Pulse transducer 68 supplies a pulse-shaped signal to the logic position 70 in which this pulse signal is added to the output of the controller 62. In this way, the pulse signal, which is outputted by the pulse transducer 68, calls up a pulse-shaped change of the actuating signal with which electric motor 38 is driven. Because of this pulse-shaped drive signal, the electric motor 38 rotates the steering column 28 via gear wheel 40 and 42 (see FIG. 1) and thereby the steering wheel 36. In this way, the pulse signal, which is outputted by the pulse transducer 68, forms a small jolt in the steering wheel 36 which is perceived by the driver as a touch-sensitive signal. As explained further above, the pulse should be of short duration, preferably shorter than 500 milliseconds and cause a deflection of the steering wheel 36 from its original position by a few degrees, especially by less than 5 degrees.

The function of the lowpass 58 in FIG. 3 will now be explained. When there is a switchover of the switch 66 from switch position (a) into switch position (b), the lowpass 58 ensures that the signal, which is supplied to the logic position 60 and therefore to the controller 62, does not change discontinuously but changes continuously. In this way, it can be prevented that a deactivation of the transverse guiding support system 18 generates a jolt-like greater change of the total steering torque at a time point at which the electric motor 38 applies an additional torque to the steering column 28. As mentioned initially herein, a greater jump in the steering torque (as it would occur for an unfiltered deactivation of the transverse guidance support system 18) could lead to an instability of the driving behavior. Lowpass 58 then defines a possibility to deactivate the transverse guidance support system 18 in a controlled manner continuously.

As a departure from the illustration of FIG. 3, the pulse, which is outputted by the pulse transducer 68, can also be fed into the control loop at other positions thereof. For example, other positions are the paths between lowpass 58 and logic position 60, or between logic position 60 and controller 62 and the path between input channel 52 and logic position 60. Stated otherwise, a pulse can not only be superposed on the actuating variable but also to the control deviation, the actual value or the desired value. Furthermore, the pulse-shaped signal can not only be additively coupled but also multiplicatively with one of the above-mentioned quantities.

Figure 4:
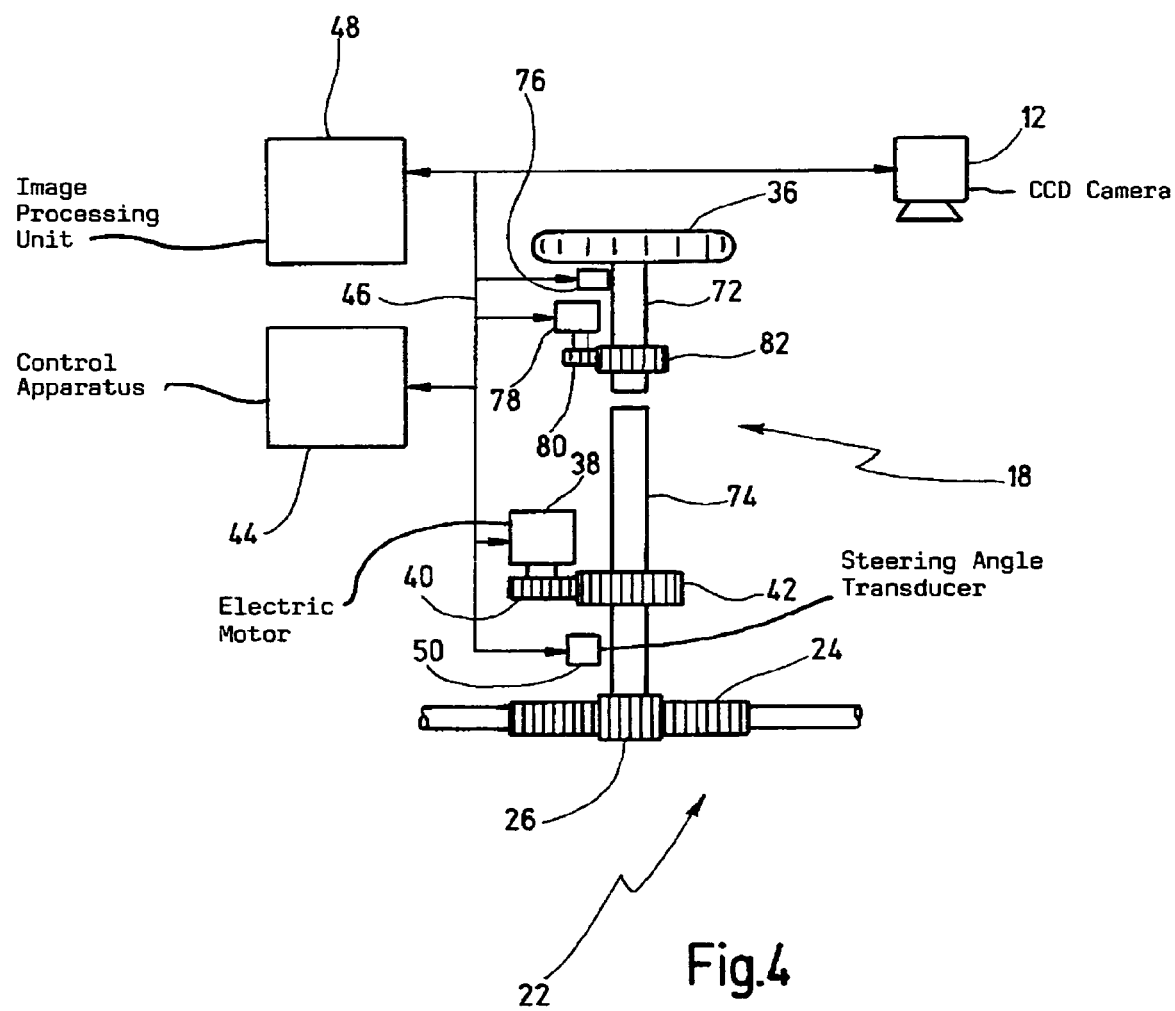
FIG. 4 is a schematic of a second embodiment of a transverse guidance support system for a motor vehicle; and, FIG. 5 is a function block diagram of a control apparatus for the second embodiment.

In FIG. 4, a second embodiment of a transverse guidance support system 18 is shown for a motor vehicle 10 in schematic representation. The second embodiment distinguishes from the first embodiment at first in that the one-part steering column 18 is replaced by a two-part steering column having an upper steering column 72 and a lower steering column 74.

The upper steering column 72 and the lower steering column 74 are not connected mechanically to each other so that they rotate with each other. In this way, the torque, which is applied by the driver to the steering wheel 36, is also no longer transferred mechanically into the steering gear 22. The realization of the driver command, which is expressed by a rotational movement at the steering wheel 36, takes place, in this case, via the activation of the electric motor 38 via bus system 46 and control apparatus 44 in dependence upon an additional desired angle transducer 76 which is mounted on the upper steering column 72.

In such a system having a divided steering column, at first a feedback to the driver as to the steering forces acting on the wheels 20 is not present because of the non-presence of the mechanical coupling of the upper steering column 72 and the lower steering column 74. In order to nonetheless provide the driver with a feel for these forces, an additional steering wheel actuator 78 (for example, an electric motor) is provided which provides a corresponding torque via a drive gear wheel 80 and a gear wheel 82 to the steering wheel 36. Gear wheel 82 is connected to the upper steering column 72 so as to fixedly rotate therewith. The control of the steering wheel actuator 78 likewise takes place via the bus system 46 by the control apparatus 44. The control apparatus 44 can, for example, draw a conclusion as to the effective steering forces from the power take-up of the electric motor 38 and can achieve a corresponding feedback torque in the steering wheel 36 via driving the steering wheel actuator 78. Systems wherein a feedback force or a feedback torque for the steering wheel 36 are developed via a steering wheel actuator, which is driven by a control apparatus, are known per Se. According to the invention, such a steering wheel actuator 78 is used in the context of the second embodiment for generating a touchsensitive signal in the steering wheel 36 when deactivating a transverse guidance support System 18.

Figure 5:
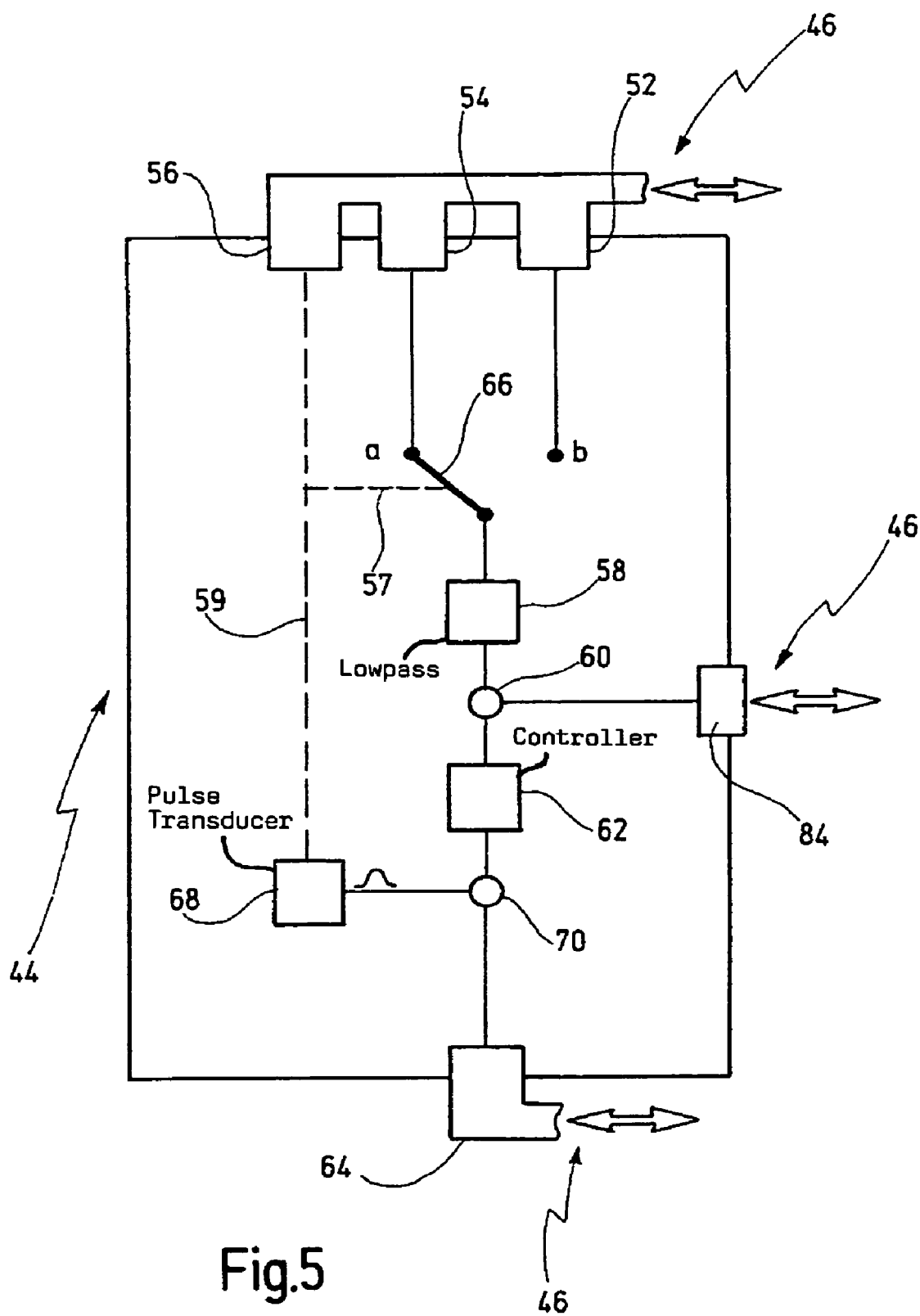

In FIG. 5, a control apparatus 44 for the second embodiment of FIG. 4 is shown in the form of a function block diagram. The control apparatus 44 for the second embodiment corresponds in many details to the control apparatus 44 of the first embodiment. The same functions in both FIGS. 3 and 5 are represented by blocks identified by the same reference numerals and reference is made to the corresponding description for FIG. 3 for explaining the interaction of these blocks.

Departing from FIG. 3, in FIG. 5, the steering angle actual value for the comparison with the corresponding desired value in the logic position 60 is not provided by the input channel 52, instead, the steering angle actual value is made available by an input channel 84. Input channel 84 receives, via the bus system 46, signals as to the steering angle (which is detected by the steering angle transducer 50) at the input of the steering gear 22, that is, the steering angle of the lower steering column 74. Further deviating from the illustration of FIG. 3, the signal of the additional desired angle transducer 76 at the upper steering column 72 is supplied to the first input channel 52 in FIG. 5.

In the switch position of the switch 66 of FIG. 5 (that is, in the switch position (a)), the control apparatus 44 of FIG. 5 operates in the same way as the control apparatus 44 of FIG. 3. If the switch 66 is moved in the course of a deactivation of the transverse guidance support system 18 from the switch position (a) into the switch position (b), the control loop of FIG. 5 remains in operation in contrast to the comparable embodiment of FIG. 3. In this case, and with the subject matter of FIG. 5, a control of the actual steering angle (as this steering angle is detected by the steering angle transducer 50) takes place via the chain of steering wheel 36, desired angle transducer 76, bus system 46, control apparatus 44 and electric motor 38. In this case, and because of the non-presence of the mechanical coupling of the two steering columns (72, 74), the desired angle transducer 76 serves as means for detecting the driver command from which a desired value for the control is derived.

It is understood that the foregoing description is that of the preferred embodiments of the invention and that various changes and modifications may be made thereto without departing from the spirit and scope of the invention as defined in the appended claims.

What is claimed is:

1. A method for signalizing the controlled automatic deactivation of a driver assistance system when operating a motor vehicle steerable with steering manipulation means manually held by the driver while operating the motor vehicle, the method comprising the step of causing said signalizing to take place with a touch-sensitive signal generated in a controlled manner and said touch-sensitive signal being applied to said steering manipulation means where it is touch sensed by said driver automatically alerting said driver to said controlled automatic deactivation.

2. The method of claim 1, wherein said assistance system, in the activated state thereof, controls at least one of the following: the distance to a forward-traveling vehicle, the speed of said motor vehicle and the transverse guidance of said motor vehicle.

3. The method of claim 2, wherein said touch-sensitive signal comprises at least one pulse which temporarily deflects said steering manipulation means out of an original position.

4. An arrangement for signalizing the controlled deactivation of a driver assistance system during operation of a motor vehicle steerable with steering manipulation means manually held by the driver while operating the motor vehicle, the arrangement comprising actuating means for impressing a controlledly generated touch-sensitive signal onto said steering manipulation means where it is touch sensed by said driver automatically alerting said driver to said deactivation.

5. The arrangement of claim 4, wherein said actuating means deflects said steering manipulation means out of an original position in a pulse-like manner.

6. The arrangement of claim 5, wherein said steering manipulation means is a steering wheel and wherein said touch-sensitive signal comprises a pulse having a pulsewidth of less than 500 ms and the magnitude of the deflection of said steering wheel is less than 5°.

7. The arrangement of claim 6, further comprising a transverse guidance support system having an actuating system for generating said pulse.

8. The arrangement of claim 7, further comprising an image processing system for triggering the deactivation of said transverse guidance support system; and, sensor means for detecting the edges of a lane and for supplying lane data to said transverse guidance support system.

9. The arrangement of claim 7, wherein said deactivation is generated by a continuous controlling down of the influence of said actuating system of said transverse guidance support system.

10. The arrangement of claim 8, wherein said pulse is generated by a commutative impressing of a control pulse on one of the following: an actuating quantity of said actuating system; a desired value of said actuating system; an actual value made available by said sensor means; and, a deviation of said actual value from said desired value which deviation is supplied to said actuating system.

11. The arrangement of claim 4, wherein said steering manipulation means is a steering wheel.

12. The method of claim 1, wherein said steering manipulation means is a steering wheel.

13. A method for signalizing the controlled automatic deactivation of a driver assistance system when operating a motor vehicle steerable with steering manipulation means manually held by the driver while operating the motor vehicle, the method comprising the step of causing said signalizing to take place with a touch-sensitive signal generated in a controlled manner and said touch-sensitive signal being applied to said steering manipulation means as a pulse temporarily deflecting said steering manipulation means out of an original position thereof with the deflection being touch sensed by said driver automatically alerting said driver to said controlled automatic deactivation.

* * * * *

UNITED STATES PATENT AND TRADEMARK OFFICE
CERTIFICATE OF CORRECTION

| | | |
|---|---|---|
| PATENT NO. | : 7,265,510 B2 | Page 1 of 1 |
| APPLICATION NO. | : 10/747355 | |
| DATED | : September 4, 2007 | |
| INVENTOR(S) | : Goetz Braeuchle and Martin Heinebrodt | |

It is certified that error appears in the above-identified patent and that said Letters Patent is hereby corrected as shown below:

<u>In column 8</u>:
Line 44: delete "commutative" and insert -- computative -- therefore.

Signed and Sealed this

Eighteenth Day of December, 2007

JON W. DUDAS
*Director of the United States Patent and Trademark Office*